United States Patent
Pemmaraju

(10) Patent No.: US 8,566,608 B2
(45) Date of Patent: Oct. 22, 2013

(54) METHODS AND APPARATUS FOR SECURING KEYSTROKES FROM BEING INTERCEPTED BETWEEN THE KEYBOARD AND A BROWSER

(75) Inventor: Ram Pemmaraju, Old Bridge, NJ (US)

(73) Assignee: Strikeforce Technologies, Inc., Edison, NJ (US)

( * ) Notice: Subject to any disclaimer, the term of this patent is extended or adjusted under 35 U.S.C. 154(b) by 1183 days.

(21) Appl. No.: 11/656,236

(22) Filed: Jan. 22, 2007

(65) Prior Publication Data

US 2007/0182714 A1      Aug. 9, 2007

Related U.S. Application Data

(60) Provisional application No. 60/765,141, filed on Feb. 2, 2006.

(51) Int. Cl.
*G06F 21/00*          (2013.01)

(52) U.S. Cl.
USPC ........... 713/189; 713/190; 713/191; 713/192; 713/193; 713/194

(58) Field of Classification Search
USPC ................................................ 713/185–189
See application file for complete search history.

(56) References Cited

U.S. PATENT DOCUMENTS

| | | | | |
|---|---|---|---|---|
| 5,748,888 A * | 5/1998 | Angelo et al. | ................... | 726/26 |
| 7,779,062 B2 * | 8/2010 | Waterson | ...................... | 709/200 |
| 2002/0080967 A1 * | 6/2002 | Abdo et al. | ................... | 380/270 |
| 2003/0120838 A1 * | 6/2003 | Howarth et al. | ................ | 710/33 |
| 2003/0159053 A1 * | 8/2003 | Fauble et al. | ................. | 713/189 |
| 2004/0080529 A1 * | 4/2004 | Wojcik | .......................... | 345/738 |
| 2004/0230805 A1 * | 11/2004 | Peinado et al. | ............... | 713/181 |
| 2004/0260536 A1 * | 12/2004 | Hwang | ............................. | 704/9 |
| 2005/0071282 A1 * | 3/2005 | Lu et al. | .......................... | 705/64 |
| 2005/0177649 A1 * | 8/2005 | Chung Geon et al. | ............ | 710/1 |

FOREIGN PATENT DOCUMENTS

KR      10-2002-0043576       *  9/2004

* cited by examiner

*Primary Examiner* — Ghazal Shehni
(74) *Attorney, Agent, or Firm* — Blank Rome LLP

(57) ABSTRACT

The invention described herein provides a method and system for foiling a keylogger by creating a custom keyboard driver and passing the keystrokes directly to the browser in an encrypted format. The browser (which is used to access the Internet) has a component that decrypts the keystroke before it is sent to the website. Thus the present invention enables the user to go to any website and enter sensitive information (passwords, credit card numbers, etc.) without the keystrokes being intercepted by Keyloggers.

In general terms, the invention described herein provides a method and system for (1) modifying the keyboard driver, (2) encrypting the keystrokes between the keyboard driver and the browser, and (3) notifying the user if the invention has been compromised.

12 Claims, 4 Drawing Sheets

METHODS AND APPARATUS FOR SECURING KEYSTROKES FROM BEING INTERCEPTED BETWEEN THE KEYBOARD AND A BROWSER

CROSS-REFERENCE TO RELATED APPLICATIONS

This application claims the benefit of Provisional Patent Application No. 60/765,141 filed on Feb. 2, 2006.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISK APPENDIX

Not Applicable.

BACKGROUND OF THE INVENTION

1. Field of the Invention

The present invention relates generally to computer security and, more particularly, to a method and apparatus of encrypting keystrokes, entered on a computer keyboard, before they are processed by a browser so that resident keyloggers cannot capture them.

2. Description of the Related Art

What is a Keylogger?

A Keylogger is a software program that runs in the background, recording all the keystrokes. Once keystrokes are logged, they are hidden in the machine for later retrieval, or shipped raw to the attacker. The attacker then peruses them carefully in the hopes of either finding passwords, or possibly other useful information such as credit card numbers, social security numbers or any other information used to commit identity theft. A keyloggers can enter a user's computer in the following ways—(1) They can be embedded in images and music files which the user downloads when they click on pictures or mp3 files. (2) They can be downloaded inadvertently when a user browses a malicious web site. (3) They can be embedded in a virus, spyware or Trojan horse. (4) They can be bundled as a part of software that a user downloads for free.

How Keyloggers Work

When a user presses a key on the keyboard, the keyboard device driver receives scan codes from the keyboard, which are sent to the keyboard layout where they are translated into messages and posted to the appropriate window in the application. Assigned to each key on a keyboard is a unique value called a scan code, a device-dependent identifier for the key on the keyboard. A keyboard generates two scan codes when the user types a key—one when the user presses the key and another when the user releases the key.

The keyboard device driver interprets a scan code and translates it to a virtual-key code, a device-independent value defined by the system that identifies the purpose of a key. After translating a scan code, the keyboard driver creates a message that includes the scan code, the virtual-key code, and other information about the keystroke, and then places the message in the system message queue. The system removes the message from the system message queue and posts it to the message queue of the appropriate thread of the application. Eventually, the thread's message loop removes the message and passes it to the appropriate window procedure of the application for processing.

A keylogger can intercept the keystroke at any point in the chain. It can intercept it in any of following ways—(1) the keyboard driver level—by replacing the keyboard driver with a rogue driver, (2) by adding filters between the keyboard driver and the system message queue. The filter receives keystrokes from the keyboard driver before it is sent to the message queue. and (3) the system message queue level—by hooking into the Windows message queue. A hook is a callback function provided by the keylogger to the system. When a keystroke message arrives in the message queue, the callback function associated with the keylogger is called and it is passed the keystroke information. The keylogger then stores the keystroke data in a file which is later sent to the hacker via an email, an IRC channel or some other means.

Current State-of-the Art in Anti-keylogging

Currently, there are two ways to stopping keyloggers—(1) detecting them and (2) preventing them from hooking the keystroke messages.

Keyloggers can be detected by analyzing their signatures. Signatures comprise the characteristics of the keylogger such as file size, file name, a checksum, or registry entries. The drawback of this method is that the signatures need to be constantly updated and is not effective against unknown keyloggers.

Keyloggers can be prevented from hooking the keystroke messages by placing a hook before the keylogger's hook and preventing the keystroke messages from going to the keylogger. The drawback of this method is that there is no way to guarantee that a hook can be placed before the keylogger's hook.

BRIEF SUMMARY OF THE INVENTION

The present invention foils a keylogger by a novel way—creating a custom keyboard driver and passing the keystrokes directly to the browser in an encrypted format. The browser (which is used to access the Internet) has a component (a Browser Helper Object) that decrypts the keystroke before it is sent to the website. Thus, the present invention enables the user to go to any website and enter sensitive information (passwords, credit card numbers, etc.) without the keystrokes being intercepted by Keyloggers.

In general terms, the invention described herein provides a method and apparatus for modifying the keyboard driver, encrypting the keystrokes between the keyboard driver and a browser component, and putting the decrypted keystrokes into the browser. Also, the invention has a mechanism to detect if its operation is foiled and make the user aware that the protection mechanism has been compromised.

OBJECT AND FEATURES OF THE INVENTION

In accordance with a first aspect of the invention, the invention features a methodology for taking control of the keyboard at the hardware level via a proprietary keyboard driver, encrypt the keystrokes and send them the browser, where they are decrypted.

In accordance with a second aspect of the invention, the invention features a methodology to detect if its operation is foiled and make the user aware that the protection mechanism has been compromised.

DETAILED DESCRIPTION OF THE PREFERRED EMBODIMENTS

Exemplary embodiments of the invention are described herein in terms of processes. Efficient prototypes of such processes have been implemented as computer system software on general-purpose PC hardware.

In accordance with a first aspect of the invention, the invention features a methodology for taking control of the keyboard at the hardware level via a proprietary keyboard driver, encrypt the keystrokes and send them the browser, where they are decrypted.

Figure 1:
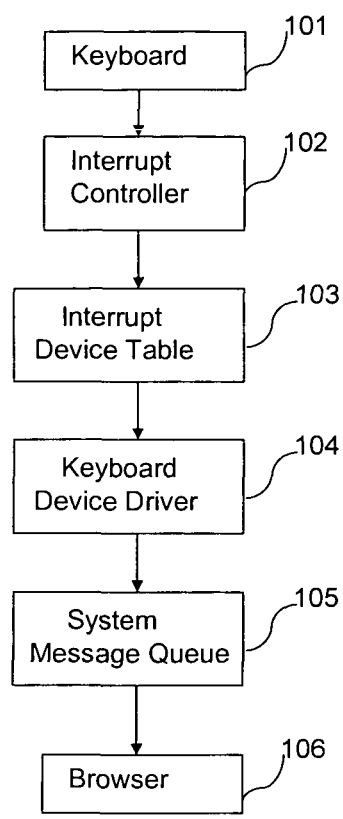
FIG. 1 depicts the methodology to process keystrokes that exists today.

FIG. 1 depicts the methodology to process keystrokes that exists today. When a key is pressed on the Keyboard 101, an interrupt is generated which is sent to the Interrupt Controller 102. The Interrupt Controller 102 goes to a specific location in the Interrupt Device Table 103 which contains the address of the Keyboard Device Driver 104 which will process the interrupt. The Keyboard Device Driver 104 retrieves the keystroke scan code, converts the scan code to virtual-key code, creates a message that includes the scan code, the virtual-key code, and other information about the keystroke, and sends it to the System Message Queue 105. The message is retrieved by the Browser 106 which displays the keystroke.

Figure 2:
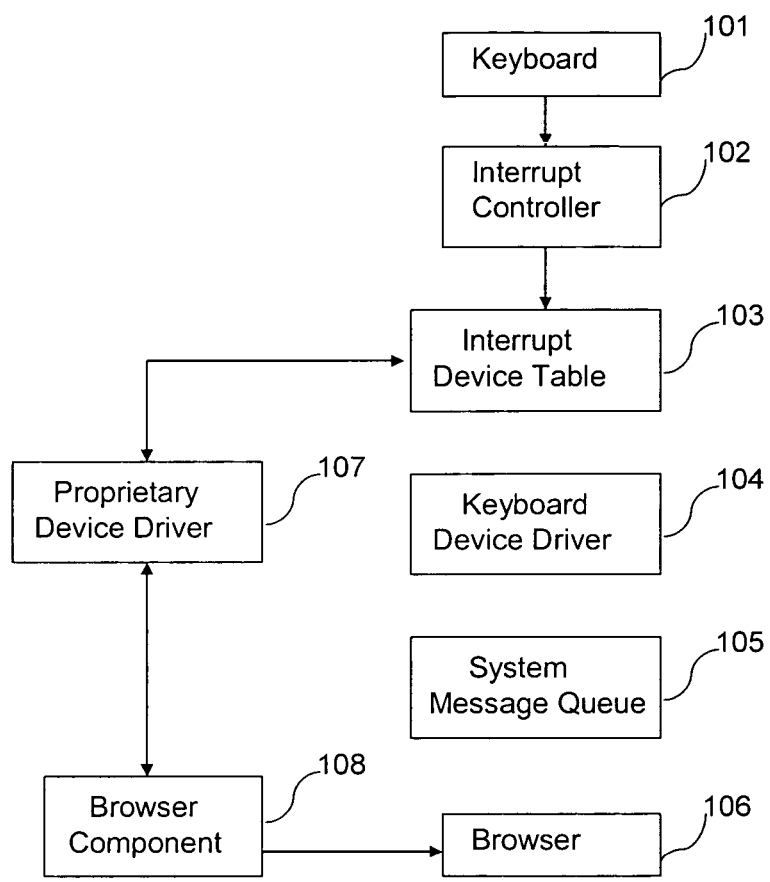
FIG. 2 depicts the novel methodology to process keystrokes that is proposed by this invention.

FIG. 2 depicts the novel methodology to process keystrokes that is proposed by this invention. The components that implement the invention are the Proprietary Device Driver 107 and the Browser Component 108. When the Browser 106 has focus, the Browser Component 108 sends a message to the Proprietary Device Driver 107 to modify the Interrupt Device Table 103 to point to the Proprietary Device Driver 107 for handling keyboard interrupts.

When a key is pressed on the Keyboard 101, an interrupt is generated which is sent to the Interrupt Controller 102. The Interrupt Controller 102 goes to a specific location in the Interrupt Device Table 103 which contains the address of the Proprietary Device Driver 107 which will process the interrupt. The Proprietary Device Driver 107 retrieves the keystroke scan code, converts the scan code to virtual-key code, creates a message that includes the scan code, the virtual-key code, and other information about the keystroke, encrypts the message and sends it to the Browser Component 108. The Browser Component 108 decrypts the message and sends it to the Browser 106 which displays the keystroke.

Figure 3:
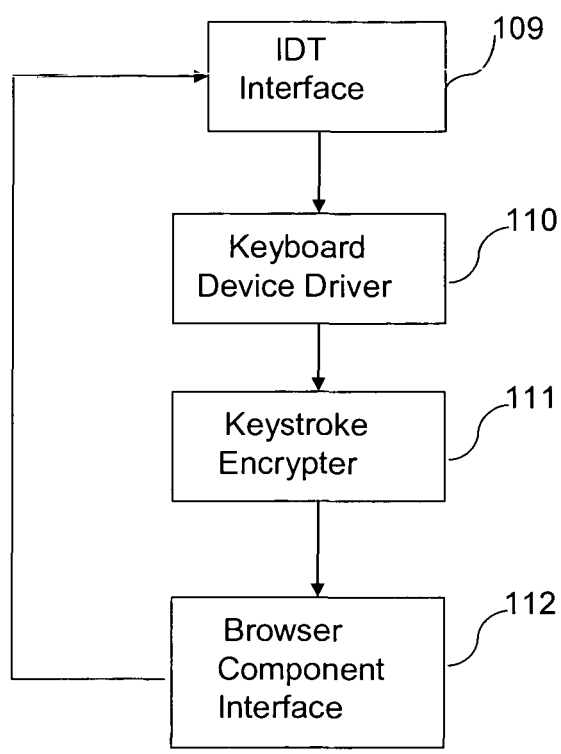
FIG. 3 depicts the Proprietary Device Driver.

FIG. 3 depicts the Proprietary Device Driver. It consists of (1) the IDT Interface 109 which communicates with the system to make changes to the Interrupt Device Table 103 (FIG. 1), (2) the Keyboard Device Driver 110 which retrieves the keystroke entered by the user, and (3) the Keystroke Encrypter 111 which encrypts the keystroke scan code and the virtual-key code, and (4) the Browser Component Interface 112 which communicates with the Browser Component 108 (FIG. 2).

Figure 4:
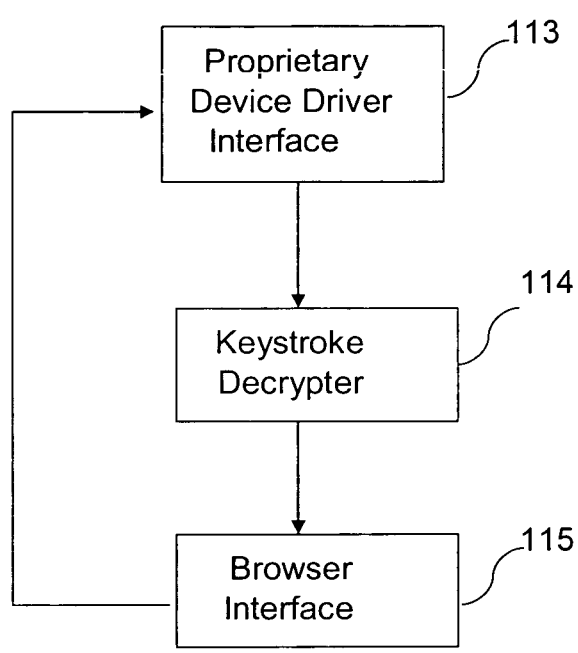
FIG. 4 depicts the Browser Component.

FIG. 4 depicts the Browser Component. It consists of (1) the Proprietary Device Driver Interface 113 which communicates with the Proprietary Device Driver 107 (FIG. 2), (2) the Keystroke Decrypter 114 which decrypts the encrypted scan code and the virtual-key code, and (3) The Browser Interface 115 which sends the decrypted keystroke message to the Browser 106 (FIG. 1).

In accordance with a second aspect of the invention, the invention features a methodology to detect if its operation is foiled and make the user aware that the protection mechanism has been compromised.

Referring to FIG. 2, when the Browser 106 has focus, the Browser Component 108 sends a message to the Proprietary Device Driver 107 to modify the Interrupt Device Table 103 to point to the Proprietary Device Driver 107 for handling keyboard interrupts. If the Proprietary Device Driver 107 is unable to modify the Interrupt Device Table 103, it realizes that the system has been compromised by a hacker and displays a message to the user that the system has been compromised.

I claim:

1. A method for securing keystrokes from being intercepted between a keyboard and a browser, the method comprising:
    modifying an Interrupt Device Table of a computer to point to a proprietary keyboard driver for handling keystrokes generated by the keyboard;
    retrieving the keystrokes using the proprietary keyboard driver, wherein retrieving the keystrokes includes bypassing a non-proprietary keyboard driver and a system message queue associated with the computer such that the keystrokes are processed by the proprietary keyboard driver and are not processed by the non-proprietary keyboard driver or by the system message queue;
    encrypting the keystrokes using the proprietary keyboard driver;
    sending the encrypted keystrokes to a browser component; and
    decrypting the encrypted keystrokes using the browser component.

2. The method of claim 1 wherein encrypting the keystrokes includes using one of symmetric keys and asymmetric keys.

3. The method of claim 2 wherein the symmetric keys include one of Data Encryption Standard (DES), triple Data Encryption Standard (3DES), Rivest Cipher 4 (RC4), Blowfish, and Advanced Encryption Standard (AES) keys, and wherein the asymmetric keys include Public Key Infrastructure (PKI) keys.

4. The method of claim 1 wherein the browser component includes a Browser Helper Object that appears as a toolbar.

5. The method of claim 1 further comprising:
    determining whether the contents of the Interrupt Device Table cannot be modified and, in response to determining that the contents of the Interrupt Device Table cannot be modified, and
    notifying the user.

6. The method of claim 1 wherein notifying the user includes generating a popup message box.

7. The method of claim 1 further comprising selectively enabling or disabling the encryption of the keystrokes.

8. The method of claim 7 wherein selectively enabling or disabling the encryption of the keystrokes includes:
    determining whether a browser window has focus;
    in response to determining that a window has focus, enabling the encryption of the keystrokes; and
    in response to determining that a window does not have focus, disabling the encryption of the keystrokes.

9. The method of claim 7 wherein selectively enabling or disabling the encryption of the keystrokes includes one of loading the proprietary keyboard driver from memory and unloading the proprietary keyboard driver from memory.

10. The method of claim 7 wherein selectively enabling or disabling the encryption of the keystrokes is performed using a button associated with the toolbar.

11. A system for securing keystrokes from being intercepted between a keyboard and a browser, the system comprising:
- a proprietary keyboard driver loaded in a memory of a computer and configured for:
  - retrieving a keystroke scan code associated with a keystroke generated by the keyboard;
  - converting the keystroke scan code into a virtual-key code;
  - creating a message that includes at least the keystroke scan code and the virtual-key code;
  - encrypting the message; and
  - sending the encrypted message to a browser component; and
- the browser component loaded in the memory of the computer and configured for:
  - instructing the proprietary keyboard driver to modify an Interrupt Device Table of the computer to point to the proprietary keyboard driver for handling keyboard interrupts and to bypass a non-proprietary keyboard driver and a system message queue associated with the computer such that the keystrokes are processed by the proprietary keyboard driver and are not processed by the non-proprietary keyboard driver or by the system message queue; and
  - decrypting the encrypted message.

12. A system for securing keystrokes from being intercepted between a keyboard and a browser, the system comprising:
- a proprietary keyboard driver loaded in a memory of a computer and configured for:
  - retrieving the keystrokes;
  - encrypting the keystrokes; and
  - sending the encrypted keystrokes to a browser component; and
- the browser component loaded in the memory of the computer and configured for:
  - instructing the proprietary keyboard driver to modify an Interrupt Device Table of the computer to point to the proprietary keyboard driver for handling keyboard interrupts and to bypass a non-proprietary keyboard driver and a system message queue associated with the computer such that the keystrokes are processed by the proprietary keyboard driver and are not processed by the non-proprietary keyboard driver or by the system message queue; and
  - decrypting the encrypted keystrokes.

* * * * *